United States Patent [19]

Satou et al.

[11] Patent Number: 5,126,780

[45] Date of Patent: Jun. 30, 1992

[54] EXPOSURE CONTROL APPARATUS AND PHOTOGRAPHING LENS IN CAMERA

[75] Inventors: Osamu Satou; Isamu Hirai, both of Tokyo, Japan

[73] Assignee: Asahi Kogaku Kogyo Kabushiki Kaisha, Tokyo, Japan

[21] Appl. No.: 530,411

[22] Filed: May 30, 1990

[30] Foreign Application Priority Data

May 31, 1989 [JP] Japan ................... 1-135869

[51] Int. Cl.$^5$ ............................... G03B 7/08
[52] U.S. Cl. .................... 354/446; 354/286
[58] Field of Search ................. 354/446, 286

[56] References Cited

U.S. PATENT DOCUMENTS

| 4,477,164 | 10/1984 | Nakai et al. ................... 354/286 |
| 4,509,842 | 4/1985 | Taniguchi et al. . |
| 4,529,288 | 7/1985 | Nakai et al. . |
| 4,540,262 | 9/1985 | Nakai et al. . |
| 4,550,993 | 11/1985 | Taniguchi et al. . |
| 4,621,918 | 11/1986 | Kawasaki et al. . |
| 4,623,238 | 11/1986 | Taniguchi et al. . |
| 4,629,305 | 12/1986 | Sato et al. . |
| 4,673,275 | 6/1987 | Nakai et al. . |
| 4,682,871 | 7/1987 | Metabi . |
| 4,699,491 | 10/1987 | Ishimura . |
| 4,733,262 | 3/1988 | Taniguchi et al. . |
| 4,739,356 | 4/1988 | Ogura et al. . |
| 4,748,467 | 5/1988 | Maekawa et al. . |
| 4,774,540 | 9/1988 | Taniguchi et al. . |
| 4,786,934 | 11/1988 | Kunze et al. . |
| 4,833,498 | 5/1989 | Kuto et al. ................... 354/286 |
| 4,841,322 | 6/1989 | Kawasaki et al. . |
| 4,868,592 | 9/1989 | Suzuki et al. ................... 354/286 |
| 4,881,094 | 11/1987 | Tevui et al. ................... 354/286 |
| 4,896,181 | 1/1990 | Saegusa ................... 354/286 |
| 5,003,399 | 3/1991 | Ishimaru et al. ................... 354/286 |

FOREIGN PATENT DOCUMENTS

| 0262679 | 4/1988 | European Pat. Off. . |
| 0266793 | 5/1988 | European Pat. Off. . |
| 0271019 | 6/1988 | European Pat. Off. . |
| 2181262 | 4/1987 | United Kingdom . |

Primary Examiner—Russell E. Adams
Attorney, Agent, or Firm—Sandler, Greenblum & Bernstein

[57] ABSTRACT

An exposure control apparatus of a camera having a memory on a photographing lens for storing lens information of the photographing lens. A lens information input device is provided on the camera body to which the photographing lens is mounted, for inputting the lens information stored in the memory. The memory has optimum diaphragm data which is determined in accordance with a predetermined specific condition of the photographing lens and which is stored in the memory as the lens information. The camera body includes an exposure operating device which arithmetically sets an exposure parameter based on the optimum diaphragm data which is input to the camera body through the lens information inputting device from the memory.

40 Claims, 17 Drawing Sheets

| Address | Stored Data of lens CPU (MSB → LSB) |
|---|---|
| 0 | Av min |
| 1 | Av max |
| 2 | focal length f(mm) |
| 3 | optimum diaphragm value F-1 |
| 4 | optimum diaphragm value F-20 |
| 5 | optimum diaphragm value F-21 |
| 6 | optimum diaphragm value F-22 |
| 7 | optimum diaphragm value F-23 |
| 8 | optimum diaphragm value F-3 |

Fig. 8

|  Address | Stored Data |
| --- | --- |
| 0 | Optimum Diaphragm F Number 1 |
| 1 | Optimum Diaphragm F Number 20 |
| 2 | Optimum Diaphragm F Number 21 |
| 3 | Optimum Diaphragm F Number 22 |
| 4 | Optimum Diaphragm F Number 23 |
| 5 | Optimum Diaphragm F Number 3 |

Fig. 18A

| Address | Stored Data |
| --- | --- |
| 10 | Optimum Diaphragm F Number 1 |
| 11 | Optimum Diaphragm F Number 20 |
| 12 | Optimum Diaphragm F Number 21 |
| 13 | Optimum Diaphragm F Number 22 |
| 14 | Optimum Diaphragm F Number 23 |
| 15 | Optimum Diaphragm F Number 3 |

Fig. 18B

| Address | Stored Data |
| --- | --- |
| 20 | Optimum Diaphragm F Number 1 |
| 21 | Optimum Diaphragm F Number 20 |
| 22 | Optimum Diaphragm F Number 21 |
| 23 | Optimum Diaphragm F Number 22 |
| 24 | Optimum Diaphragm F Number 23 |
| 25 | Optimum Diaphragm F Number 3 |

Fig. 18C

| Address | Stored Data | |
| --- | --- | --- |
| 0 | MTF. data at open diaphragm | MTF10 |
| 1 | Second diaphragm from open diaphragm | MTF11 |
| 2 | Fourth diaphragm from open diaphragm | MTF12 |
| 3 | Sixth diaphragm from open diaphragm | MTF13 |
| 4 | Avmin | |
| 5 | Avmax | |
| . | . | |
| . | . | |
| . | . | |

Fig. 19

EXPOSURE CONTROL APPARATUS AND PHOTOGRAPHING LENS IN CAMERA

BACKGROUND OF THE INVENTION

1. Field of the Invention

The present invention relates to an automatic exposure control apparatus for controlling the exposure in accordance with lens information specific to a photographing lens, as read by a camera body.

2. Description of Related Art

In an automatic exposure control camera system in which a photographing lens is detachably attached to a camera body, lens information specific to the photographing lens is stored in a memory provided in the photographing lens. The camera body reads the lens information prior to the photographing, so that the lens information can be used to control the exposure.

However, conventional lens information is limited to an open diaphragm value, a minimum diaphragm value and a focal length, etc. Therefore, an optimum diaphragm value at which a best picture can be taken by the photographing lens, for example, a diaphragm value at which substantially no flare occurs or a diaphragm value at which a high resolving power can be obtained can be only by experience or intuitionally found by a photographer.

SUMMARY OF THE INVENTION

The primary object of the present invention is to provide an automatic exposure control camera in which a picture can be taken at thee optimum diaphragm value of the photographing lens used.

To achieve the object mentioned above, according to the present invention, there is provided a camera which comprises a memory on a photographing lens for storing lens information of the photographing lens and a control device on a camera body to which the photographing lens is mounted, for reading the lens information stored in the memory, wherein an optimum diaphragm value of the photographing lens in accordance with a predetermined condition is stored in the memory as the lens information.

With this arrangement, if, for example, an optimum diaphragm value having a highest resolving power is stored in the memory as an optimum diaphragm value, it is not necessary for an photographer to set the optimum diaphragm value to take a picture at the optimum diaphragm value, so that a picture of the highest resolving power can be easily obtained.

The optimum diaphragm value of the photographing lens may be related to the subject distance.

Taking such a relationship into account, according to another aspect of the present invention, the photographing lens is provided with an subject distance detecting device for detecting the subject distance, so that optimum diaphragm data corresponding to a plurality of subject distances thus detected or to a plurality of subject distance zones (which are obtained by dividing the object distance thus into zones) are stored in the memory. A mechanism for selecting optimum diaphragm data corresponding to the subject distance detected by the subject distance detecting device provided so that a picture can be taken at an optimum diaphragm value or a value approximate thereto, based on the optimum diaphragm data, regardless of the object distance.

In case of a photographing lens being a zoom lens, there is a possibility that the optimum diaphragm value depends on the focal length.

Taking this possibility into consideration, according to still another aspect of the present invention, the zoom lens is provided with a focal length detecting mechanism for detecting the focal length, so that optimum diaphragm data corresponding to a plurality of focal lengths thus detected or to a plurality of focal length zones (which are obtained by dividing the focal length range into zones) thus detected are stored in the memory. A selecting mechanism for selecting optimum diaphragm data corresponding to the focal length detected by the focal length detecting mechanism is provided, whereby a picture can be taken at an optimum diaphragm value or a value approximate thereto, based on the optimum diaphragm data, in a zoom lens, regardless of the focal length of the lens.

The conditions (parameters) which determine the optimum diaphragm data are selected, for example, from when a highest MTF (Modulation Transfer Function) is given, when the opening of the diaphragm is substantially circular, when a highest resolving power is obtained, or when the brightness of the edge of the image field is higher than a predetermined value, etc.

It is also possible to memorize the respective optimum diaphragm data corresponding to the above-mentioned conditions (parameters) in the memory means, so that the optimum diaphragm data can be selectively used.

Alternatively, it is also possible to provide more than one optimum diaphragm data for each conditions (parameter). In this alternative, for example, diaphragm assessment data in accordance with each condition is stored for a plurality of diaphragm values of the photographing lens, so that the camera body can select appropriate data which meets a predetermined condition from the diaphragm assessment data.

BRIEF DESCRIPTION OF THE DRAWINGS

The invention will be described below in detail with reference to the accompanying drawings, in which:

FIG. 8 is a schematic diagram showing memorized data in a lens CPU according to the present invention;

FIGS. 18A, 18B and 18C are diagrams showing memorized data of a lens CPU shown in FIGS. 17A and 17B;

FIG. 19 is a diagram showing memorized data of a lens CPU in which diaphragm assessment data at a plurality of diaphragm values is memorized; and, FIG. 20 is a flow chart of an operation for selecting an optimum diaphragm value from diaphragm assessment data at a plurality of diaphragm values.

DESCRIPTION OF PREFERRED EMBODIMENTS

Figure 5A:
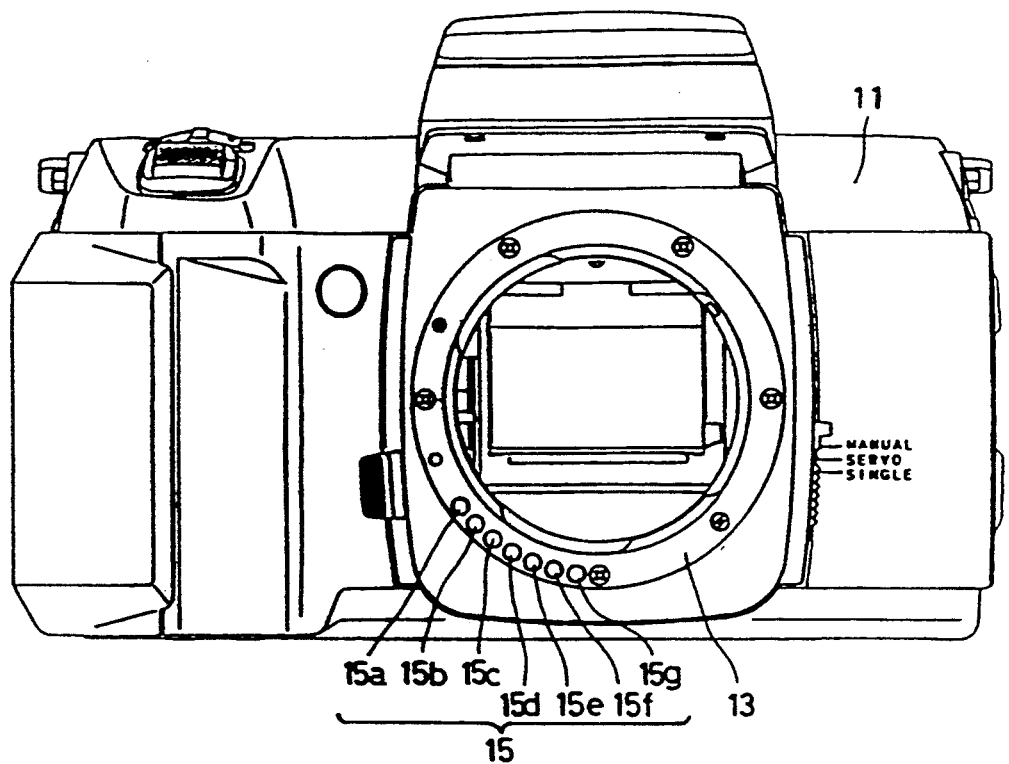
FIGS. 5A and 5B are front elevational views of a camera body having an automatic exposure control apparatus and a mount portion of a photographing lens, respectively.
Figure 5B:
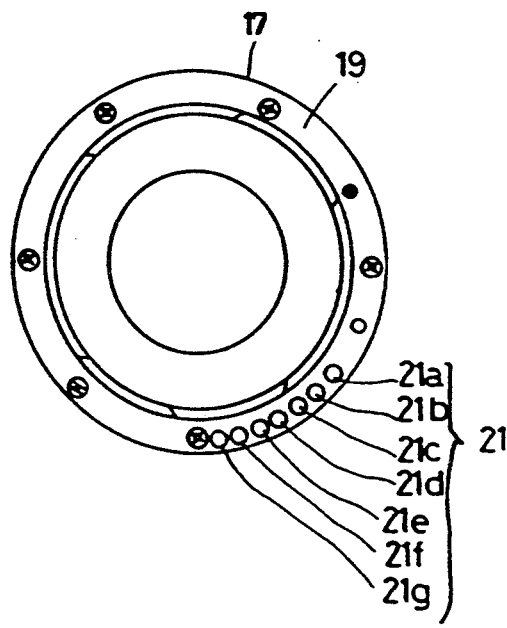

FIGS. 5A and 5B are front elevational view of a camera body having an automatic exposure control apparatus and a mounting portion of a photographing lens.

On a body mount 13 on a camera body 11 are provided a plurality of electrical contacts 15 ($15a \sim 15g$). Similarly, a plurality of electrical contacts 21 ($21a \sim 21g$) corresponding to the electrical contacts 15 are provided on a lens mount portion 19 of the photographing lens 17. The electrical contacts 15 are connected to the corresponding electrical contacts 21 when the photographing lens 17 is attached to the camera body 11.

A lens CPU 23 which has an internal memory function to memorize information peculiar to the photographing lens is provided in the photographing lens 17. An aperture diaphragm F number (or full-aperture diaphragm APEX value Avmin), a minimum diaphragm F number (or minimum aperture diaphragm APEX value Avmax), and a focal length f are stored in the internal memory of the lens CPU 23. In the illustrated embodiment, an optimum diaphragm F number of the photographing lens $A_{vgood}$ is also stored in the lens CPU 23.

Examples of the optimum diaphragm F numbers are as follows.

A diaphragm value which has been considered best in a MTF assessment or a diaphragm value which has a highest diaphragm value is stored as a first optimum diaphragm value F-1, a diaphragm value at the closest object, determined taking the depth of field into account is stored as a second optimum diaphragm value F-2, and a diaphragm value which is optimum for a portrait or a diaphragm value at which the aperture is substantially circular (circular diaphragm) is stored as a third optimum diaphragm value F-3. The optimum diaphragm values F-1, F-2 and F-3 are read and selectively used in accordance with the programed exposure modes or the displacement of the advance of the photographing lens. The circular diaphragm referred to is a diaphragm at which the shape of the opening defined by an inner edge of diaphragm blades is substantially circular.

Examples of optimum diaphragm values set by the MTF assessment will be described below with reference to FIG. 1.

The MTF assessment which has been used is one of the assessment methods of the lens efficiency and includes various parameters. For a 35 mm camera, supposing that a spatial frequency is 30/mm, an image height is 6 mm, and an object distance U is infinite ($U = \infty$), the MTF assessment is designated by a graph shown in FIG. 1. In the graph shown in FIG. 1, the ordinate represents the MTF assessment value and the abscissa represents the diaphragm value (F number). The MTF assessment is good when the assessment value is large.

Figure 1:
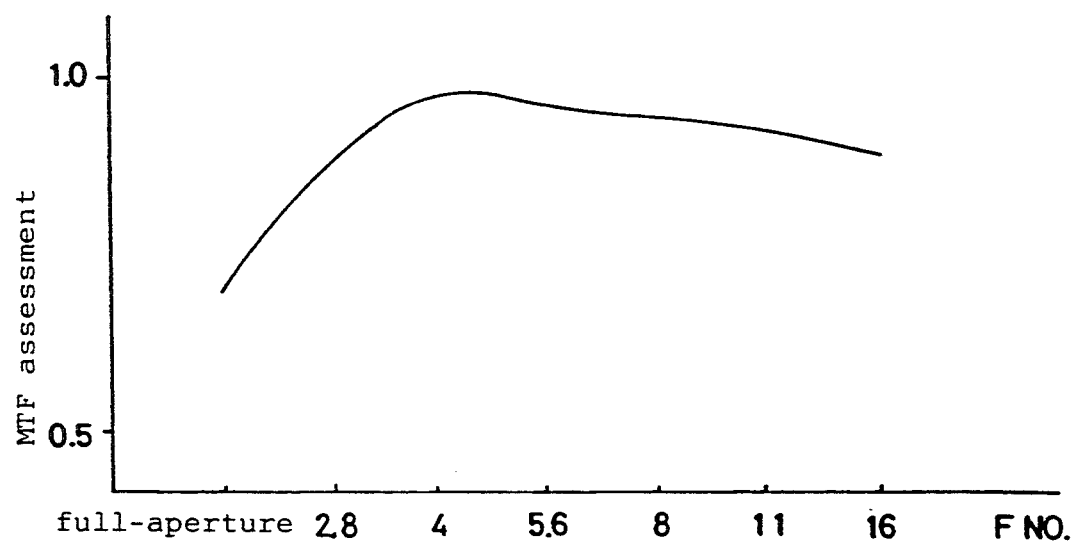
FIGS. 1, 2 and 3 are graph diagrams showing assessment results in accordance with a predetermined assessment method for determining optimum diaphragm values.

In FIG. 1, since the F number which gives the largest MTF assessment value is 4, the first optimum diaphragm F number F-1 is F4.

The programed exposure mode at which the optimum diaphragm data of the highest MTF assessment will be referred to as a program 1.

Figure 2:
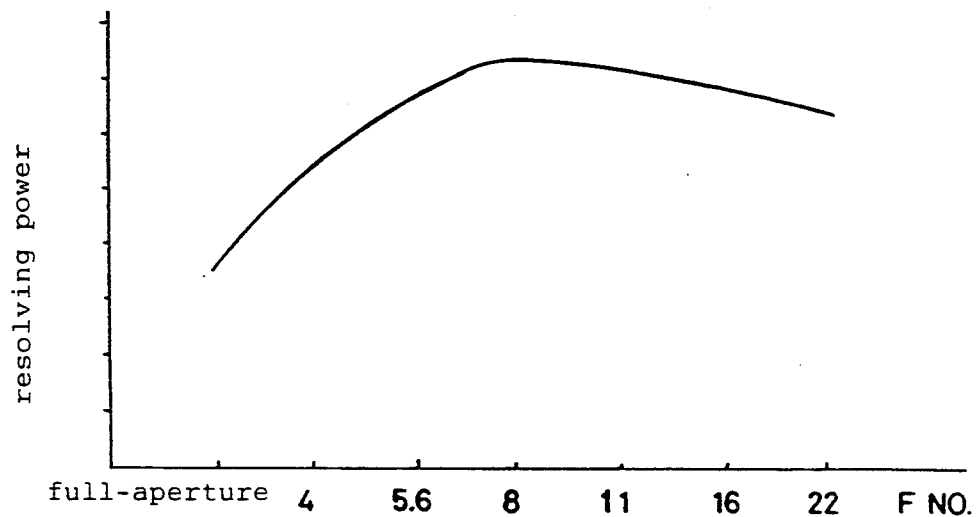

The following discussion will be directed to how to set the optimum diaphragm data in accordance with the resolving power assessment (FIG. 2).

The resolving power of the photographing lens varies in accordance with the diaphragm value. Generally speaking, the resolving power becomes high when the diaphragm aperture is reduced. However, an excess reduction of the diaphragm aperture invites a lowering of the resolving power due to diffraction.

The characteristics of the resolving power are shown in FIG. 2. In FIG. 2, the ordinate represents the resolving power (number/mm) and the abscissa represents the F number. In the illustrated embodiment, since the highest resolving power is obtained when the F number is 8, the optimum diaphragm F-2 is F8.

Figure 3:
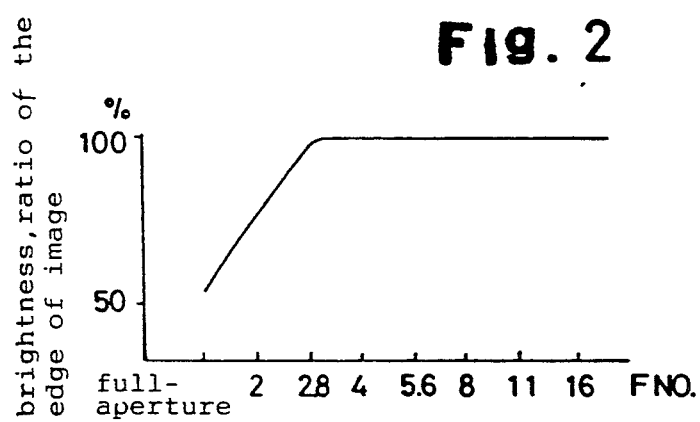
Figure 4:
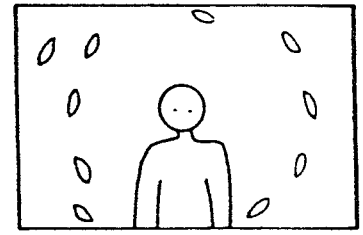
FIG. 4 is a schematic diagram showing "out-of-focus" by vignetting.

FIGS. 3 and 4 show how to set the optimum diaphragm data by the vignetting assessment.

Vignetting is one of the items for testing the performance of a lens. Vignetting (brightness ratio of the edge of image field or aperture efficiency), at certain image height, represents the extent of darkness of an image toward the center image due to vignetting of incident light by a portion other than the diaphragm blades, for example by a front lens group supporting frame.

Generally speaking, a photographing lens is largely eclipsed by a front lens frame, a rear lens frame, or a lens barrel when the diaphragm is open. At the open diaphragm values, the brightness ratio of the edge of image field due to vignetting is sometimes less than 50%.

The brightness ratio of the edge of image field is usually improved by reducing the diaphragm aperture. The relationship, at certain image height, between the brightness ratio of the edge of image field and the diaphragm value is shown in FIG. 3. In FIG. 3, the ordinate designates the brightness ratio of the edge of image field and the abscissa designates the diaphragm value (F number).

The shape of the entrance pupil depends on the vignetting. If the vignetting occurs at the edge of an image, the entrance pupil is usually elliptical like a rugby ball.

Since the "out of focus" condition of a picture, particularly the out of focus condition of a point image is coincident with the shape of pupil, if there is a vignetting at the edge of a human figure to be taken, the "out of focus" condition of the background (i.e., unsharp background) appears to be concentric, as shown in FIG. 4. Such a concentrical unsharp condition is considered quite bad. Accordingly, a lens which is used for in photographing situations in which an unsharp condition is considered very important, such as a portrait lens, is designed so that the occurrence of vignetting is minimized.

However, to minimize vignetting, it is necessary to use a large and heavy lens. Furthermore, it is very difficult to maintain a good image forming efficiency.

In the present invention, the diaphragm value at which no vignetting occurs is set to be an optimum diaphragm value or an optimum F number. In case of a photographing situation in which the unsharp condition is considered important, a picture can be taken at the optimum diaphragm value or a diaphragm value smaller than the optimum diaphragm value to prevent the rugby ball like unsharpness.

The condition which determines the optimum diaphragm value is not limited to the forgoing. For instance, the optimum diaphragm value can be set as a condition in which no flare occurs or in which the least aberration occurs, etc.

When a photographic characteristic which places emphasis on the "Out of Focus" condition is evaluated, as an influential factor to the evaluation, there exists "a circular diaphragm" as well as vignetting.

The circular diaphragm is a kind of means to make a shape of the "Out of Focus" smooth. The means of the circular diaphragm is designed to make the shape of diaphragm genuinely circular at a constant diaphragm value. Namely, the shape of "Out of Focus" becomes approximately circular.

In the present invention, a F-value at which the diaphragm value becomes genuinely circular can be set as the most optimum diaphragm value.

Circuit of Camera

Figure 6:
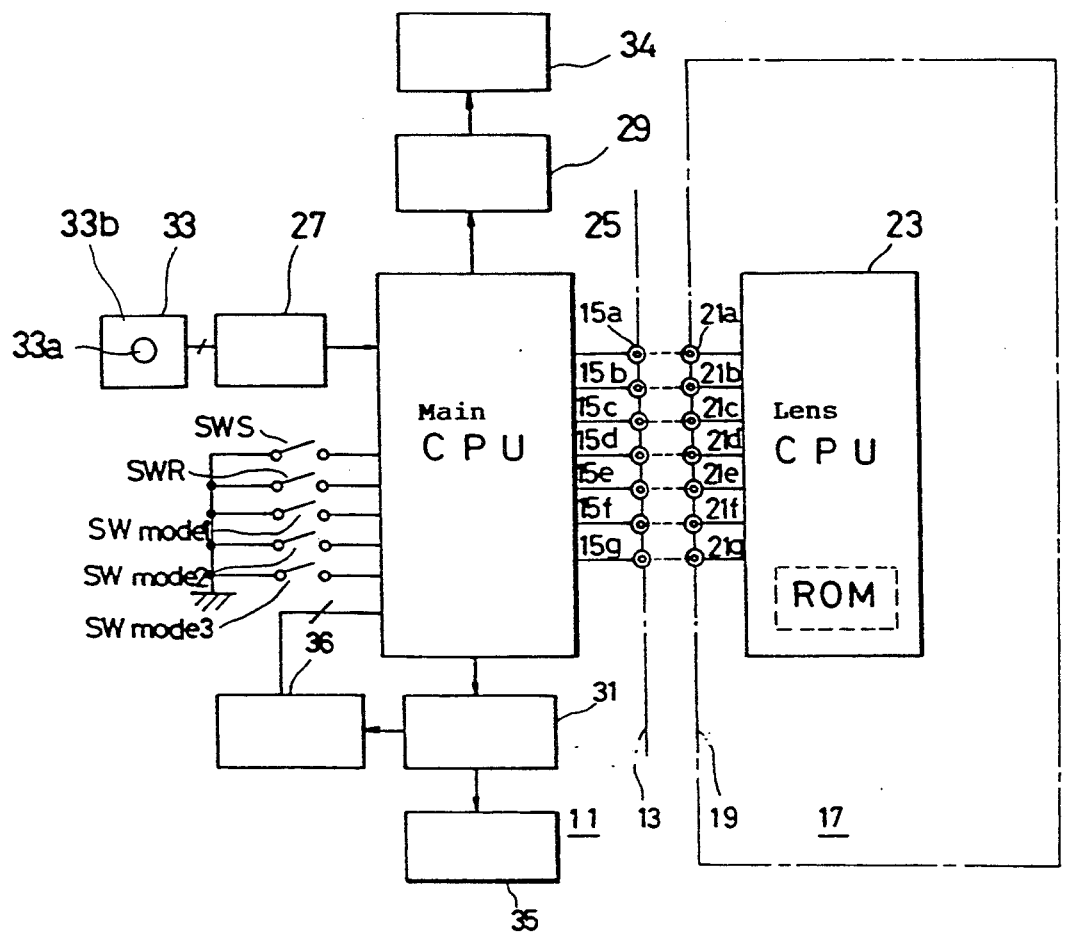
FIG. 6 is a block diagram of a circuit arrangement of an exposure control apparatus of the invention.

The following discussion will be directed to the circuit arrangement of an exposure control of the camera mentioned above, with reference to FIG. 6.

In the camera body 11 a main CPU 25 is provided which generally controls the whole operation of the camera and performs calculation operations, such as exposure, etc. The main CPU 25 has input means to which the optimum diaphragm data is input from the photographing lens, and selecting means for selecting optimum diaphragm values from the optimum diaphragm data.

A photometer circuit 27 is connected to the input port of the main CPU 25. An exposure control circuit 29 and a film feed control circuit 31 are connected to the output port of the main CPU 25. Also, to the input port of the main CPU 25 are connected a photometer switch SWS, a shutter release switch SWR, a first mode switch SWmode1, a second mode switch SWmode2 and a third mode switch SWmode3. When the photometer switch SWS is made ON, the main CPU 25 performs the data communication between the lens CPU 23, the exposure calculation operation and an automatic focus operation, etc. When the shutter release switch SWR is turned ON, the main CPU 25 peforms the shutter release operation.

The photometer circuit 27 performs logarithmical compression of the output signal of the light receiving element 33 which receives light reflected from an subject to be photographed and performs the A/D conversion of the signal, so that a photometer signal (luminance signal Bv) is output therefrom to the main CPU 25. The light receiving element 33 of the illustrated embodiment has a first portion 33a which measures luminance of the center portion of the picture plane and a second portion 33b which measures luminance of the circumferential portion of the picture plane. The photometer circuit 27 independently processes the outputs from the two portions 33a and 33b to output the respective luminance signals Bv1 and Bv2. The photometer circuit 27 starts the operation when the photometer switch SWS is turned ON.

A film sensitivity (a speed value) input circuit 36 is to detect the DX codes (corresponding to the ISO codes of film) on a cassette film.

The exposure control circuit 29 drives the diaphragm/shutter 34 in accordance with the diaphragm value signal Av and the shutter speed signal Tv output from the main CPU 25 when the drive signal is output from the main CPU 25 to expose the film with a predetermined quantity of light. The exposure operation is commenced when the release shutter switch SWR is turned ON.

Upon completion of the exposure operation of the diaphragm/shutter 34, the film feed control circuit 31 starts the film feed motor 35 to advance the film by one frame to finish the exposure operation.

In the illustrated embodiment, the mode switches SWmode1, SWmode2 and SWmode3 select the exposure modes among the programs 1, 2, 3 and 4 to change the exposure mode.

The communication ports of the main CPU 25 are connected to the electrical contacts 15. The communication ports of the lens CPU 23 are connected to the electrical contacts 21. The corresponding electrical contacts 15 and 21 are connected to each other when the photographing lens 17 is mounted to the camera body 11. Namely, when the photographing lens 17 is mounted to the camera body 11, the communication ports of the main CPU 25 are connected to the communication ports of the lens CPU 23 provided on the photographing lens 17, so that data communication can be effected therebetween.

Figure 7:
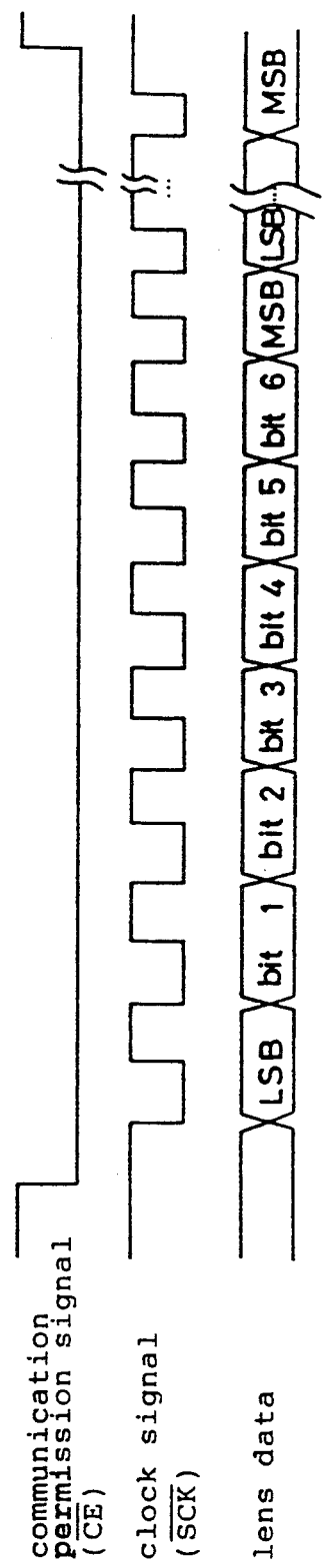
FIG. 7 is a timing chart of a communication operation between a lens and a camera body, according to the present invention.

In the internal memory (ROM) of the lens CPU 23 are stored lens information, such as the optimum diaphragm data, etc. which can be read by the read signal output from the main CPU 25 through the communication ports thereof. The read operation will be explained below with reference to the timing chart shown in FIG. 7.

The data communications are serially performed through three lines connected to the electrical contacts 15a, 15b and 15c and the electrical contacts 21a, 21b and 21c connected thereto. The communication operation will be described below with reference to the electrical contacts 15a, 15b and 15c.

Upon commencement of communication, the main CPU 25 outputs the communication permission signal to the electrical contact 15a and the clock pulse to the electrical contact 15b, respectively. The main CPU 25 receives the lens data from the electrical contact 15c.

When the communication permission signal is output to the electrical contact 15a, the lens CPU 23 is in an enable position in which the lens data stored therein can be output. When the clock pulse is output to the electrical contact 15b, the lens data is output from the lens CPU 23 to the electrical contact 15c synchronously with the raise of the clock pulse. Examples of the lens data stored in the lens CPU 23 are shown in FIG. 8.

When the lens data is sent to the main CPU 25 from the lens CPU 23, the main CPU 25 inputs and memorizes therein the lens data at the edges of the raise of the clock pulse. Upon completion of the memory input into of the necessary lens data, the outputs of the clock pulse and the communication permission signal are stopped to finish the communication. Namely, the communication permission signal becomes "H".

Main Operation of the Camera Body

The exposure operation of the camera will be described below with reference to FIG. 9 which shows a program diagram and FIGS. 10 to 14 which show flow charts of the operation. The exposure operation is performed by the main CPU 25 in accordance with the program stored therein.

When the photometer switch SWS is turned ON, the routine starts. The main CPU 25 commences communication with the lens CPU 23 to read the lens data stored in the lens CPU 23 to memorize the same (step S41). Thereafter, scanning of the mode switches SWmode1, SWmode2 and SWmode3 are effected, so that the exposure mode selected by the mode switch SWmode1, SWmode2 or SWmode3 is set at step S42. In the illustrated embodiment, there are four program exposure modes consisting of a program 1 for a normal exposure, a program 2 for an image quality priority exposure, a program 3 for an almighty exposure, and a program 4 for a circular diaphragm exposure (portrait exposure), and an EE exposure mode.

Thereafter, the luminance signals Bv1, Bv2 are input from the photometer circuit 27 and the film sensitivity (the speed value) Sv is input from the film sensitivity input circuit 36 (step S43, S43-1). The photometer circuit 27 starts the operation when the photometer switch SWS is turned ON. The exposure value Ev is arithmetically obtained, for example, by the following equation;

$$Ev=(Bv1+Bv2)/2+Sv$$

in accordance with the luminance signals BV1 and Bv2 and the film sensitivity Sv (step S44).

After that, the set exposure mode is checked at step S42 to perform the set exposure sub-routine in order to determine the diaphragm value Av and the shutter speed (the time value) Tv (steps S45~S50).

When the diaphragm value Av and the shutter speed are determined, the shutter release switch SWR position is checked at step S51. If the release switch SWR is turned ON, the diaphragm/shutter 34 is driven in accordance with the diaphragm value Av and the shutter speed Tv obtained in the exposure sub-routine mentioned above to effect the exposure (step S52). Upon completion of the exposure, the film is advanced by one frame at step S53, so that the control is returned to step S41. If no the release switch SWS is not ON at step S51, if the photometer switch SWS is ON is checked at step S54. If the photometer switch SWS is turned ON, the control proceeds to step S41. If the photometer switch SWS is not ON, the control proceeds to END.

The above-mentioned operations are repeated until the film is wound to the last frame.

The exposure operation will be further explained with reference to the sub-routines shown in FIGS. 11 to 14.

Program 1

Figure 11:
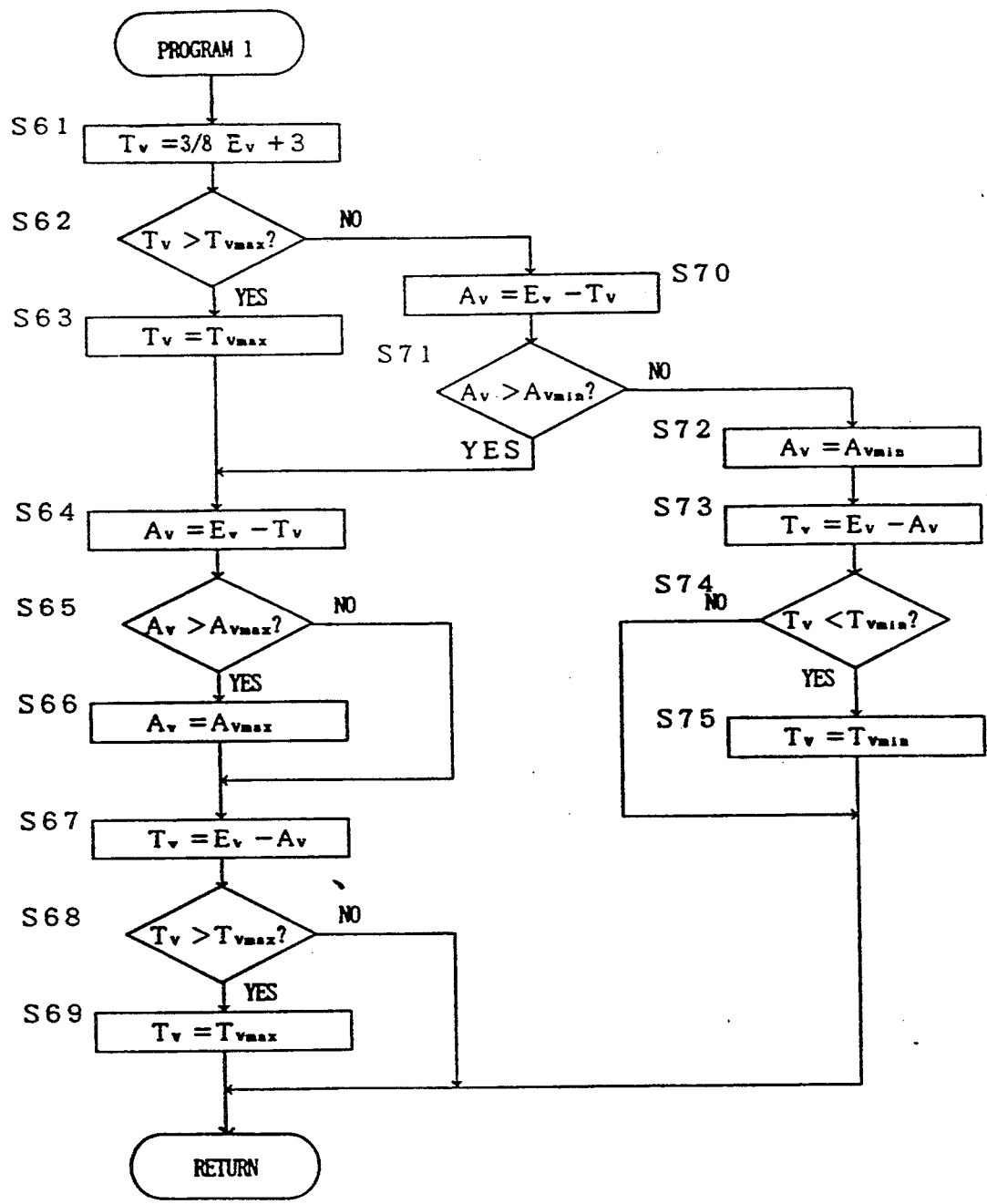
FIG. 11 is a flow chart of a sub-routine of a normal programmed exposure mode (program 1)

FIG. 11 shows a sub-routine of a normal program exposure mode at step S46.

In this sub-routine, the shutter speed Tv is arithmetically calculated at step S61 in accordance with a predetermined Tv equation, based on the exposure value Ev obtained at step S44. Thereafter, if the shutter speed Tv is above a maximum shutter speed Tvmax is checked (step S62).

If the shutter speed Tv is higher than the maximum shutter speed Tvmax, the shutter speed Tv is replaced with the maximum shutter speed Tvmax, so that the optimum diaphragm value Av is determined in accordance with the shutter speed Tv (i.e. the maximum shutter speed Tvmax) and the exposure value Ev (steps S63 and S64).

Thereafter, whether the diaphragm value Av thus obtained is above the maximum diaphragm value Avmax of the photographing lens is checked at step S65. If the diaphragm value Av is larger than the maximum diaphragm value Avmax, the diaphragm value Av is replaced with the maximum diaphragm value Avmax, so that the shutter speed Tv is predetermined in accordance with the diaphragm value Av (i.e. the maximum diaphragm value Avmax) at steps S66 and 67. Thereafter, if the shutter speed Tv thus obtained is above the maximum shutter speed Tvmax is checked again at step S68. If the shutter speed Tv is larger than the maximum shutter speed Tvmax, the shutter speed Tv is replaced with the maximum shutter speed Tvmax at step S69, so that the control proceeds to RETURN. If the shutter speed Tv is not larger than the maximum shutter speed Tvmax, the control is directly returned.

If the shutter speed Tv is not higher than the maximum shutter speed Tvmax at step S62, the diaphragm value Av is determined in accordance with the shutter speed Tv and the exposure value Ev obtained (step S70). Thereafter, if the diaphragm value Av thus obtained is larger than the minimum diaphragm value Avmin (open F number) is checked at step S71. If the diaphragm value Av is larger than the minimum diaphragm value Avmin, the control is returned to step S64. If the diaphragm value Av is not larger than the minimum diaphragm value Avmin, the diaphragm value Av is replaced with the minimum diaphragm value Avmin at step S72.

After the diaphragm value Av is replaced with the minimum diaphragm value Avmin, the shutter speed Tv is determined again. Thereafter, if the shutter speed Tv is above the minimum shutter speed Tvmin is checked at step S74. If the shutter speed Tv is not smaller than the minimum shutter speed Tvmin, the control is returned. If the shutter speed Tv is smaller than the minimum shutter speed Tvmin, the shutter speed Tv is replaced with the minimum shutter speed Tvmin, so that the control is returned (step S75).

The program diagram I of the normal program 1, as shown in FIG. 5 is obtained by the above-mentioned operations. Note that at steps S69 and S75, if the determined shutter speed Tv exceeds allowable limits of the camera, the exposure value will be under or over the proper exposure value (under exposure or over exposure). In this case, it is possible to warn the operator that the exposure will not be within the proper range.

Program 2

The operation of the program exposure mode (image quality priority program) 2 at step S47, in which the optimum diagphragm value $A_{vgood1}$ (optimum diaphragm value 1) of the photographing lens has a priority will be described below with reference to FIG. 12.

The diaphragm value Av is set to be the optimum diaphragm value $A_{vgood1}$ of the photographing lens at which a best picture can be taken at step S81. Thereafter, the shutter speed Tv is determined in accordance with the diaphragm value $A_{vgood1}$ and the exposure value Ev which has been obtained at step S44 (step S82).

If the shutter speed Tv thus obtained is an effective shutter speed of the camera is checked, that is, the shutter speed Tv is between the maximum shutter speed Tvmax and the minimum shutter speed Tvmin is checked at step S83. If the shutter speed Tv is between the maximum shutter speed Tvmax and the minimum shutter speed Tvmin, the shutter speed Tv is maintained. On the contrary, if the shutter speed Tv is larger than the maximum shutter speed Tvmax, the shutter speed Tv is replaced with the maximum shutter speed Tvmax (step S84) and the control proceeds to step S87. If the shutter speed Tv is smaller than the minimum shutter speed Tvmin (step S85), the shutter speed Tv is replaced with the minimum shutter speed Tvmin (step S86) and the control proceeds to step S87.

In view of the possible replacement of the shutter speed Tv with the maximum shutter speed Tvmax or the minimum shutter speed Tvmin at step S84 or S86, the diaphragm value Av is determined again in accordance with the exposure value Ev and the shutter speed Tv at step S87.

Thereafter, if the diaphragm value Av is the effective diaphragm value is checked, that is, if the diaphragm value Av is in the effective range, the diaphragm value Av is maintained. On the contrary, if the diaphragm value Av is smaller than the optimum diaphragm value $A_{vgood1}$ the diaphragm value Av is replaced with the optimum diaphragm value $A_{vgood1}$. If the diaphragm value Av is larger than the maximum diaphragm value Avmax, the diaphragm value is replaced with the maximum diaphragm value Avmax and the control is returned (steps S88~S91).

Figure 9:
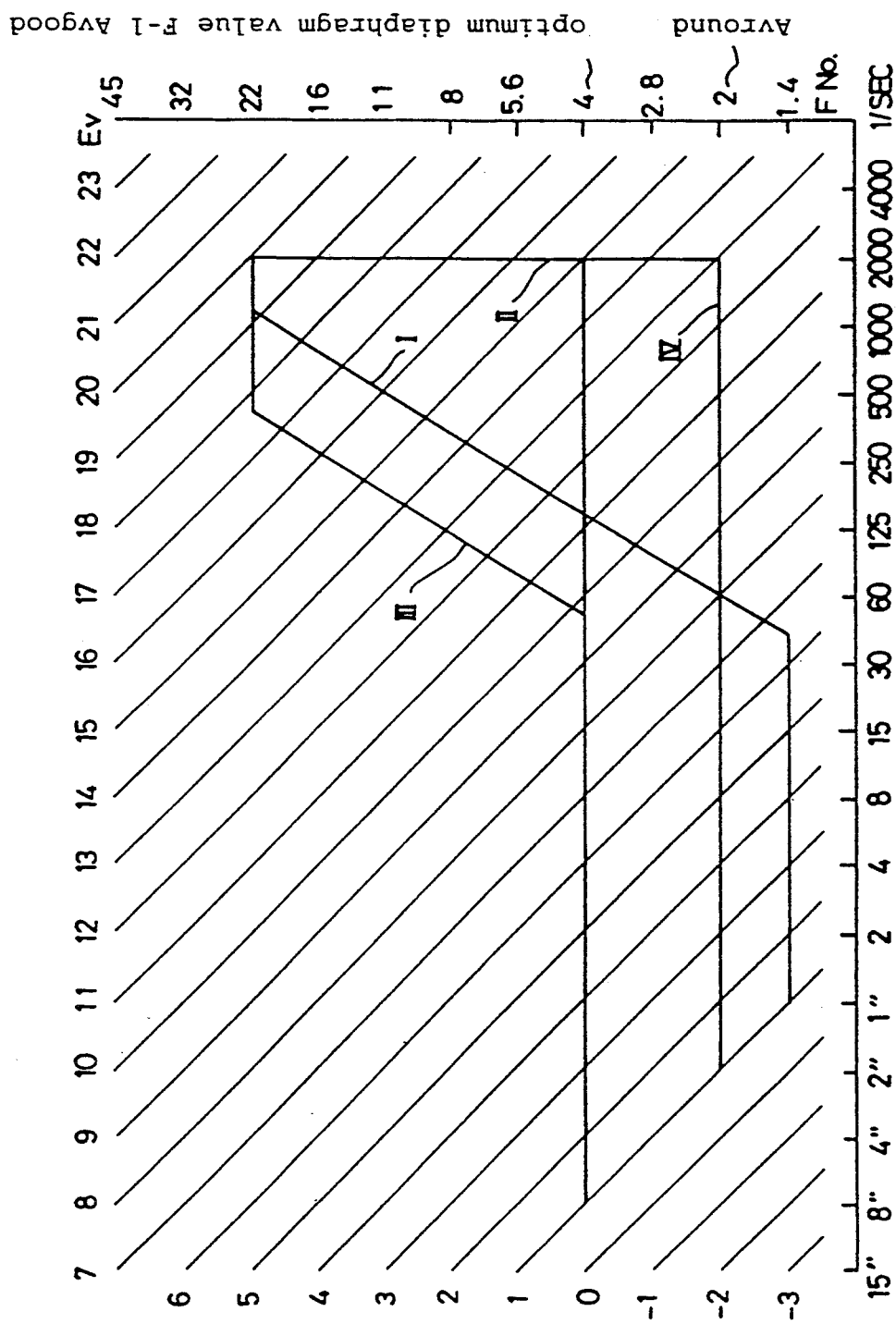
FIG. 9 is a program diagram of a lens CPU shown in FIG. 8.

The program diagram II of the optimum diaphragm value priority program, as shown in FIG. 9 is obtained by the above-mentioned operations.

As can be seen from the foregoing, when a picture is taken in the program 2 in which the optimum diaphragm value $A_{vgood1}$ has a priority, since the diaphragm is automatically set to be the optimum diaphragm value $A_{vgood1}$ with a priority, anyone can take a picture at an optimum diaphragm value of the photographing lens.

Program 3

The operation of the program exposure mode 3 at step S48, in which the optimum diaphragm value 1 and the camera-shake prevention in combination have a priority will be described below with reference to the sub-routine shown in FIG. 13.

The hand-shake limit shutter speed Tvf is usually is given by 1/f second or an APEX value of $\log_2 f$, wherein f is a focal length of the photographing lens. In the illustrated embodiment, approximations of $\log_2 f$ are utilized.

Figure 13:
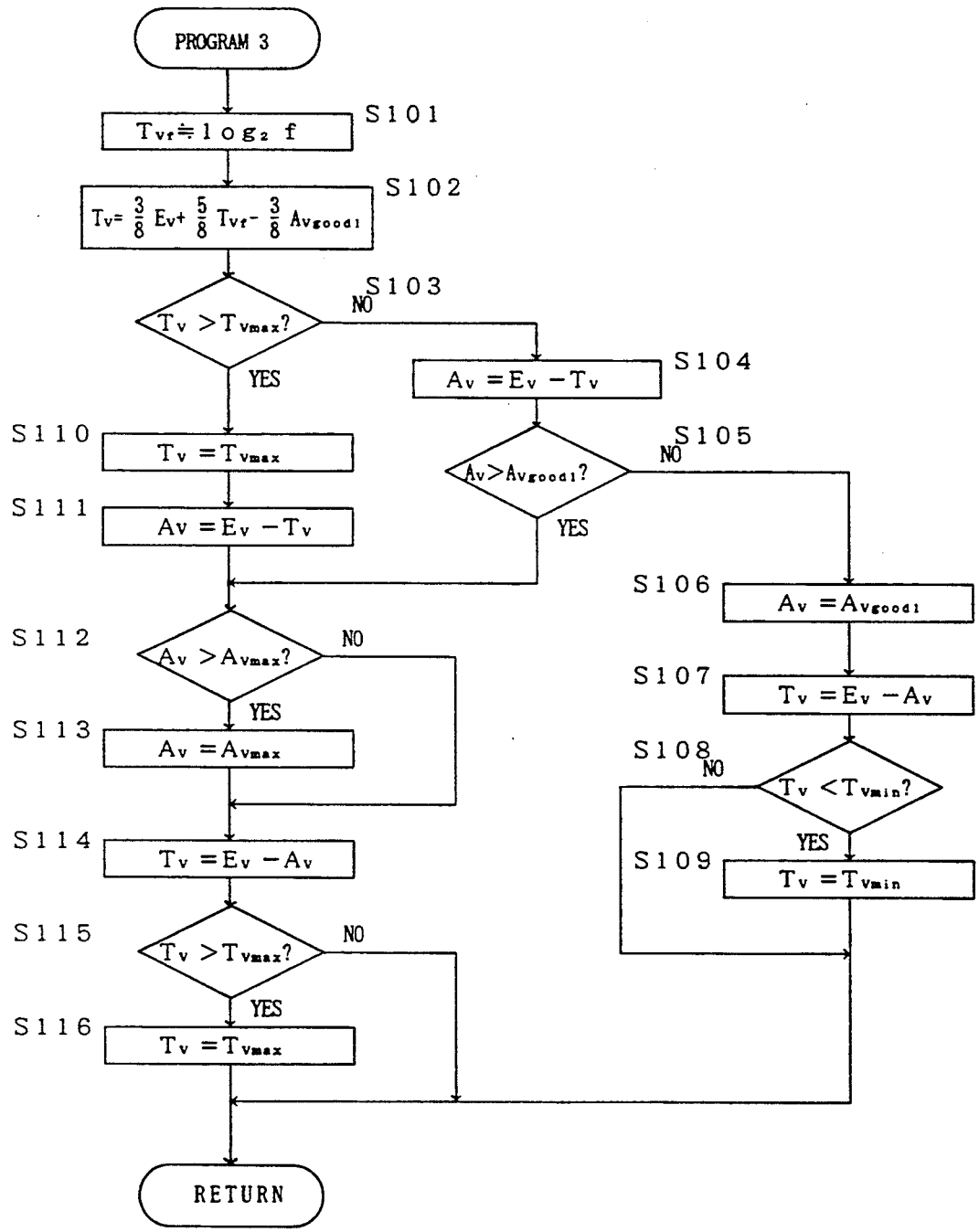
FIG. 13 is a flow chart of a sub-routine of a programed exposure mode (program 3) in which an optimum diaphragm value and a camera-shake prevention has a priority in combination.
Figure 14:
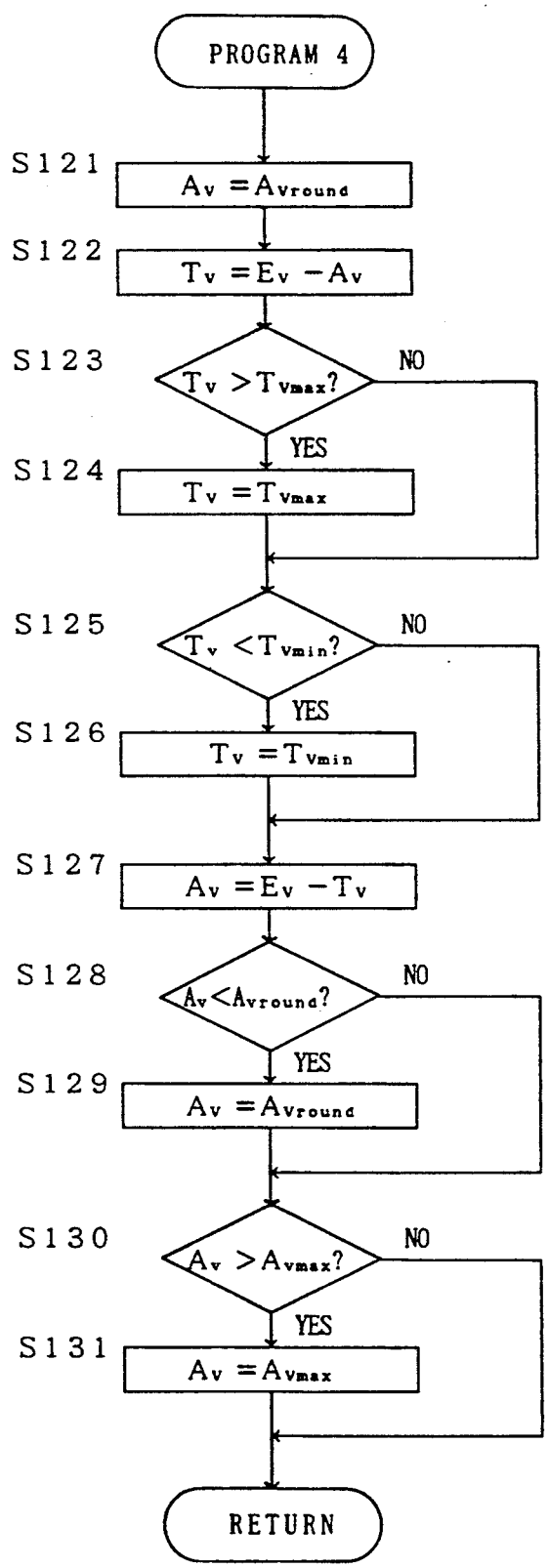
FIG. 14 is a flow chart of a sub-routine of a programed exposure mode (program 4) in which a circular diaphragm value has a priority.

In the sub-routine shown in FIG. 13, the hand-shake limit shutter speed Tvf is first determined in accordance with the focal length data f of the photographing lens, read by the lens CPU 23 at step S41.

Thereafter, the shutter speed Tv is determined by the following equation, in accordance with the limit shutter speed Tvf, the optimum diaphragm value $A_{vgood1}$ and the exposure value Ev, at step S102;

$$Tv = (\tfrac{1}{2})Ev + (\tfrac{1}{2})Tvf - (\tfrac{1}{2})A_{vgood1}$$

At step S103, whether the shutter speed Tv is larger than the maximum shutter speed Tvmax is checked.

If the shutter speed Tv is not larger than the maximum shutter speed Tvmax, the diaphragm value Av is determined, based on the shutter speed Tv, and then, whether the diaphragm value Av thus obtained is larger than the optimum diaphragm value $A_{vgood1}$ is checked (steps S104 and S105).

If the diaphragm value Av is larger than the optimum diaphragm value $A_{vgood1}$, the control proceeds to step S112. Conversely, if the diaphragm value Av is not larger than the optimum diaphragm value $A_{vgood1}$, the control proceeds to step S106, in which the diaphragm value Av is replaced with the optimum diaphragm value $A_{vgood1}$. Then, the shutter speed Tv is predetermined in accordance with the diaphragm value Av (i.e. the optimum diaphragm value $A_{vgood1}$), so that if the shutter speed Tv is smaller than the minimum shutter speed Tvmin is checked at step S108. If the shutter speed Tv is smaller than the minimum shutter speed Tvmin, the shutter speed Tv is replaced with the minimum shutter speed Tvmin at step S109 and the control is returned. Conversely, if the shutter speed Tv is not smaller than the minimum shutter speed Tvmin, the control is directly returned.

If the shutter speed Tv is larger than the maximum shutter speed Tvmax at step S103, the shutter speed Tv is replaced with the maximum shutter speed Tvmax at step S110. Thereafter, the diaphragm value Av is determined in accordance with the shutter speed Tv (i.e. the maximum shutter speed Tvmax) at step S111.

Whether the diaphragm value Av obtained at step S111 or S104 is larger than the maximum diaphragm value Avmax is checked at step S112. If the diaphragm value Av is larger than the maximum diaphragm value Avmax, the diaphragm value Av is replaced with the maximum diaphragm value Avmax (step S113) to determine the shutter speed Tv (step S114). If the diaphragm value Av is not larger than the maximum diaphragm value Avmax, the shutter speed Tv is determined in accordance with the diaphragm value Av (step S114).

Thereafter, if the shutter speed Tv is larger than the maximum shutter speed Tvmax is checked at step S115. If the shutter speed Tv is larger than the maximum shutter speed Tvmax, the shutter speed Tv is replaced with the maximum shutter speed Tvmax at step S116, and then the control is returned. If the shutter speed Tv is not larger than the maximum shutter speed Tvmax, the control is directly returned.

The program diagram III shown in FIG. 9 can be obtained by the above-mentioned operations.

Program 4

As mentioned above, for example when taking a portrait, a circular diaphragm value $A_{vround}$ in which the diaphragm aperture is circular is used to shade the background of a main object. An embodiment in which the circular diaphragm value $A_{vround}$ is used as an optimum diaphragm value $A_{vgood}$ will be described below with reference to a flow chart shown in FIG. 14.

When a picture is taken at the circular diaphragm value, a circular unsharpness of a point light source appears at the edge of an image thereof. At a diaphragm value other than the circular diaphragm value, usually a polygonal unsharpness appears at the edge of an image. Furthermore, the circular unsharpness of a circumferential object appears at the circular diaphragm value. Note that at the open diaphragm value, the circumferential object usually has a rugby-ball like unsharpness due to the vignetting.

In the program 4, the diaphragm value Av is set to be the circular diaphragm value $A_{vround}$ obtained at step S41, so that the shutter speed Tv is determined in accordance with the diaphragm value Av ($A_{vround}$) and the exposure value Ev (steps S121 and S122).

Thereafter, if the shutter speed Tv is within the allowable shutter speed range of the associated camera is checked at step S123. Namely, if the shutter speed Tv is larger than the maximum shutter speed Tvmax at step S123, the shutter speed Tv is replaced with the maximum shutter speed Tvmax at step S124. At step S125, if the shutter speed Tv is smaller than the minimum shutter speed Tvmin, the shutter speed Tv is replaced with the minimum shutter speed Tvmin at step S126. Then, the diaphragm value Av is predetermined in accordance with the shutter speed Tv and the exposure value Ev at step S127.

Thereafter, if the diaphragm value Av is the circular diaphragm value $A_{vround}$ is checked at step S128. If the diaphragm value Av is not the circular diaphragm value $A_{vround}$, the diaphragm value Av is replaced with the circular diaphragm value $A_{vround}$ at step S129.

Thereafter, if the diaphragm value Av is larger than the maximum diaphragm value Avmax is checked at step S130. If the diaphragm value Av is larger than the maximum diaphragm value Avmax, the diaphragm value Av is replaced with the maximum diaphragm value Avmax (step S131), and then the control is returned.

The program diagram IV shown in FIG. 9 can be obtained by the operations mentioned above.

EE Mode

Figure 15:
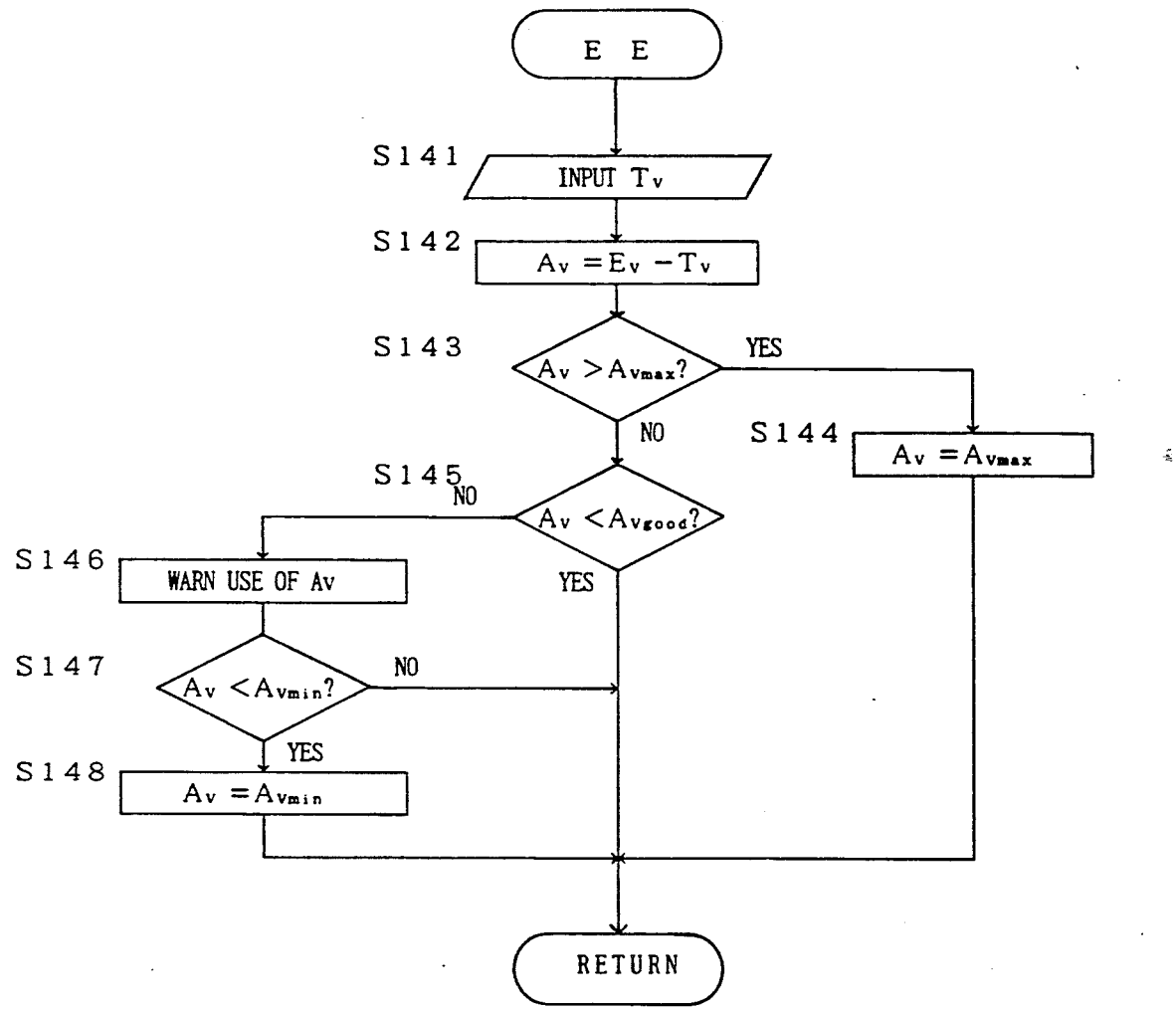
FIG. 15 is a flow chart of a sub-routine of a shutter speed priority exposure mode (EE mode) in which an optimum diaphragm value is used as a diaphragm warning signal.

The following discussion will be directed to an embodiment in which the optimum diaphragm value $A_{vgood}$ data is used as a diaphragm warning signal in the shutter speed priority EE mode, with reference to a flow chart shown in FIG. 15.

In this embodiment, the diaphragm warning is effected when the diaphragm value Av is smaller than the optimum diaphragm value $A_{vgood}$, that is, when the diaphragm aperture diameter is larger than the optimum diaphragm aperture diameter.

First, the shutter speed Tv is input at step S141, so that the diaphragm value Av is determined in accordance with the shutter speed Tv and the object luminance Bv at step S142.

Thereafter, whether the diaphragm value Av is larger than the maximum diaphragm value Avmax is checked at step S143. If the diaphragm value Av is larger than the maximum diaphragm value Avmax, the diaphragm value Av is replaced with the maximum diaphragm value Avmax to be returned at step S144.

If the diaphragm value Av is not larger than the maximum diaphragm value Avmax, if the diaphragm value Av is smaller than the optimum diaphragm value $A_{vgood}$ is checked at step S145. If the diaphragm value Av is not smaller than the optimum diaphragm value $A_{vgood}$, the control is returned.

If the diaphragm value Av is not smaller than the optimum diaphragm value $A_{vgood}$, the AV warning is effected at step S146. Thereafter, if the diaphragm value Av is smaller than the minimum diaphragm value Avmin is checked at step S147. If no diaphragm value Av is smaller than the minimum diaphragm value Avmin, the control is returned. If the diaphragm value Av is smaller than the full-aperture diaphragm value Avmin, the diaphragm value is replaced with the full-aperture diaphragm value Avmin to be returned at step S148.

As can be understood from the foregoing, at the EE mode, when the diaphragm value Av is smaller than the optimum diaphragm value $A_{vgood}$, this is warned. Thus, the warning enables a photographer to judge whether or not the optimum diaphragm value $A_{vgood}$ should be used.

Depth of Field Priority Mode

Generally speaking, the depth of field is decreased as the object distance is shortened. Since the depth of field becomes small, for instance in the macro mode, a picture of an object is usually taken at a large diaphragm value Av, so that the depth of field increases as the object comes close to the camera. In the present invention, a plurality of diaphragm values corresponding to the object distances can be the optimum diaphragm values $A_{vgood}$.

In this case, for instance, optimum diaphragm F numbers 20, 21, 22 and 23 corresponding to the object distances are memorized in the ROM of the lens CPU 23 as a plurality of optimum diaphragm values $A_{vgood}$ (FIG. 8), so that the optimum diaphragm values $A_{vgood}$ corresponding to the object distances can be selected to be supplied to the main CPU 25. This will be explained below in more detail with reference to FIGS. 16A and 16B.

Figure 16A:
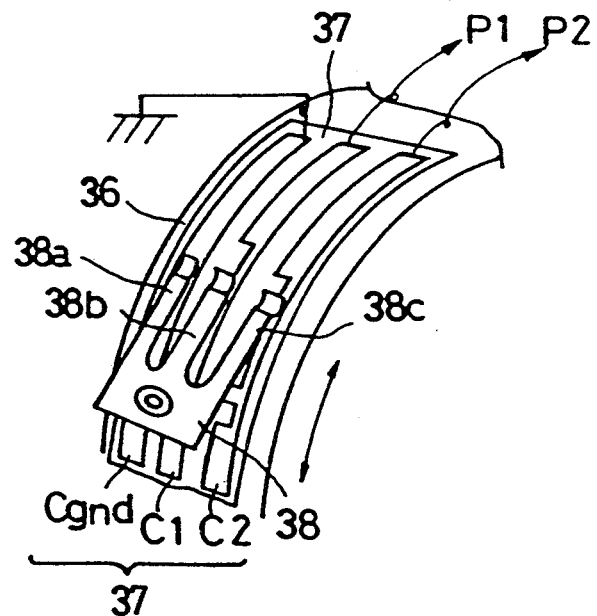
FIGS. 16A and 16B are schematic views of an embodiment in which an optimum diaphragm value is set in accordance with an object distance.
Figure 16B:
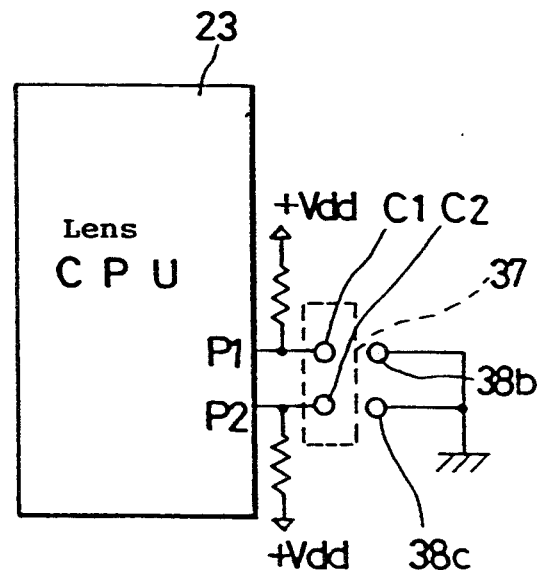
Figure 17A:
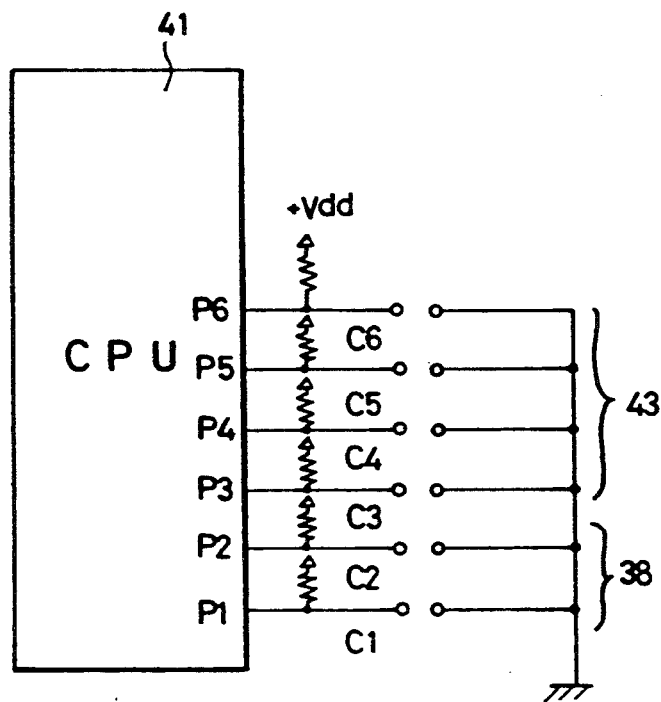
FIGS. 17A and 17B are schematic views of an embodiment in which an optimum diaphragm value is set in accordance with a focal length.
Figure 17B:
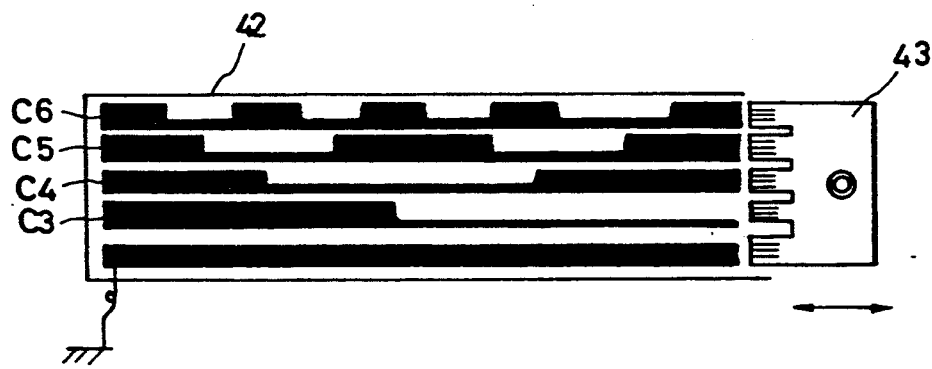

The object distance data is detected for example by a position detecting device which detects the position of a distance ring of the photographing lens, as shown in FIG. 16A. The distance ring 36 of the photographing lens is provided with a code plate 37 which produces digital position data and which is brought into sliding contact with a brush 38 provided on an immovable portion of the photographing lens. In the illustrated embodiment, the object distance at the macro mode is divided into four macro sections which are coded together with a normal photographing section onto the code plate 37.

The code plate 37 has three code portions Cgnd, C1 and C2 which are made of an electrically conductive material and which are insulated from one another, on an insulation member 38. The code portions C1 and C2 produce digital code signals of the position of the distance ring 36 by the combination of a wide and narrow portion.

The code portions C1 and C2 are connected to the input ports P1 and P2 of the lens CPU 23, respectively. The code portion Cgnd is grounded. The brush 38 has three contact pieces 38a, 38b and 38c which are independently brought into contact with the code portions Cgnd, C1 and C2, at their one end, respectively, and which are connected to each other at the other ends thereof. Consequently, the level of the code portions C1 and C2 is "0" ("L" level) when they are connected to the contact pieces 38a and 38b, and "1" ("H" level) when they are not connected to the contact pieces 38a and 38b, respectively.

The lens CPU 23 checks the level of the input ports P1 and P2 to detect the focused object distance of the photographing lens and converts the object distance to the optimum diaphragm F number corresponding thereto to store the optimum diaphragm F number.

Table 1 below shows the optimum diaphragm values in the divided macro sections when the optimum diaphragm value at the normal photographing section is F4.

TABLE 1

| P1 | P2 | Optimum diaphragm F number | Object distance |
|---|---|---|---|
| 0 | 0 | 4 | Normal photographing area → ∞ |
| 0 | 1 | 5.6 | ↑ |
| 1 | 0 | 8 | ↓ |
| 1 | 1 | 11 | Close distance |

Figure 12:
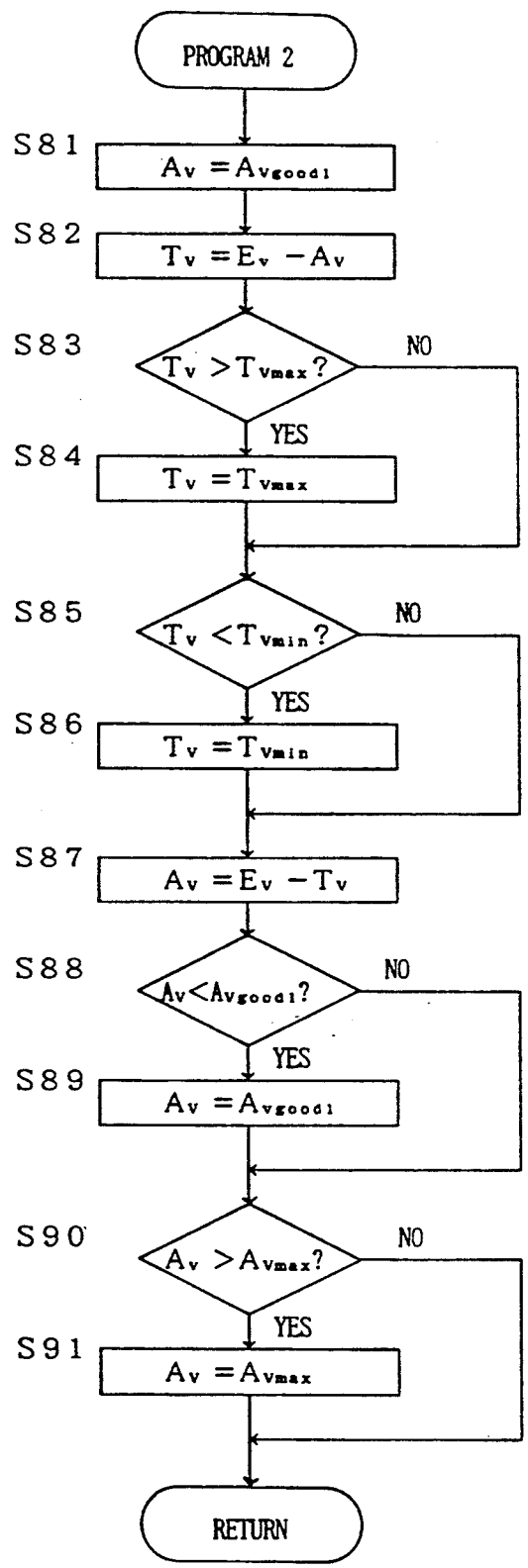
FIG. 12 is a flow chart of a sub-routine of a programmed exposure mode (program 2) in which an optimum diaphragm value has a priority.

Note that the exposure control is effected in accordance with the program 2 shown in FIG. 12.

According to the embodiment mentioned above, at the macro mode, the optimum diaphragm F number becomes large as the object distance becomes small to increase the depth of field.

Furthermore, in a camera having an object distance measuring device, in order to change the optimum diaphragm value depending on the object distance, it is possible to obtain the object distance data from the object distance measuring device.

Application to Zoom Lens

The following explanation will be directed to an embodiment which is applied to a zoom lens (FIGS. 17A, 17B, 18A, 18B and 18C).

In case of a zoom lens, there is a possibility that the optimum diaphragm value varies in accordance with the focal length. Accordingly, the optimum diaphragm values corresponding to the focal lengths are stored in the ROM of the lens CPU 41, so that the optimum diaphragm values Av corresponding to the input focal lengths f are selectively transferred to the camera body.

The focal length data f of the zoom lens is given by a focal length code plate 42 having four codes C3~C6 and a brush 43 having contact pieces which are brought into contact with the respective codes C3~C6. The basic construction of the code plate 42 and the brush 43 is substantially same as that of the object distance code plate 36 and the brush 38 shown in FIG. 16A. The code plate 42 is secured to a zoom operation ring or a zoom cam ring (not shown), and the brush 43 is secured to an immovable portion of the lens opposite to the zoom operation ring or the zoom cam ring.

The codes C1 and C2 of the object distance code plate 36 are connected to the ports P1 and P2 of the lens CPU 41. The codes C3~C6 of the focal length code plate 42 are connected to the ports P3~P6 of the lens CPU 41.

The optimum diaphragm F numbers corresponding to the focal lengths are stored in the internal ROM of the lens CPU 41. For instance, in case of 35 mm~70 mm zoom lens, the focal length is divided into three zones, so that an optimum diaphragm F number corresponding to each of the divided focal lengths is stored in the ROM of the lens CPU 41.

Examples of the stored data are shown in FIGS. 18A~18C. In the illustrated embodiment, the optimum diaphragm value at the addresses 0, 10 and 20 is F-1.

Figure 10:
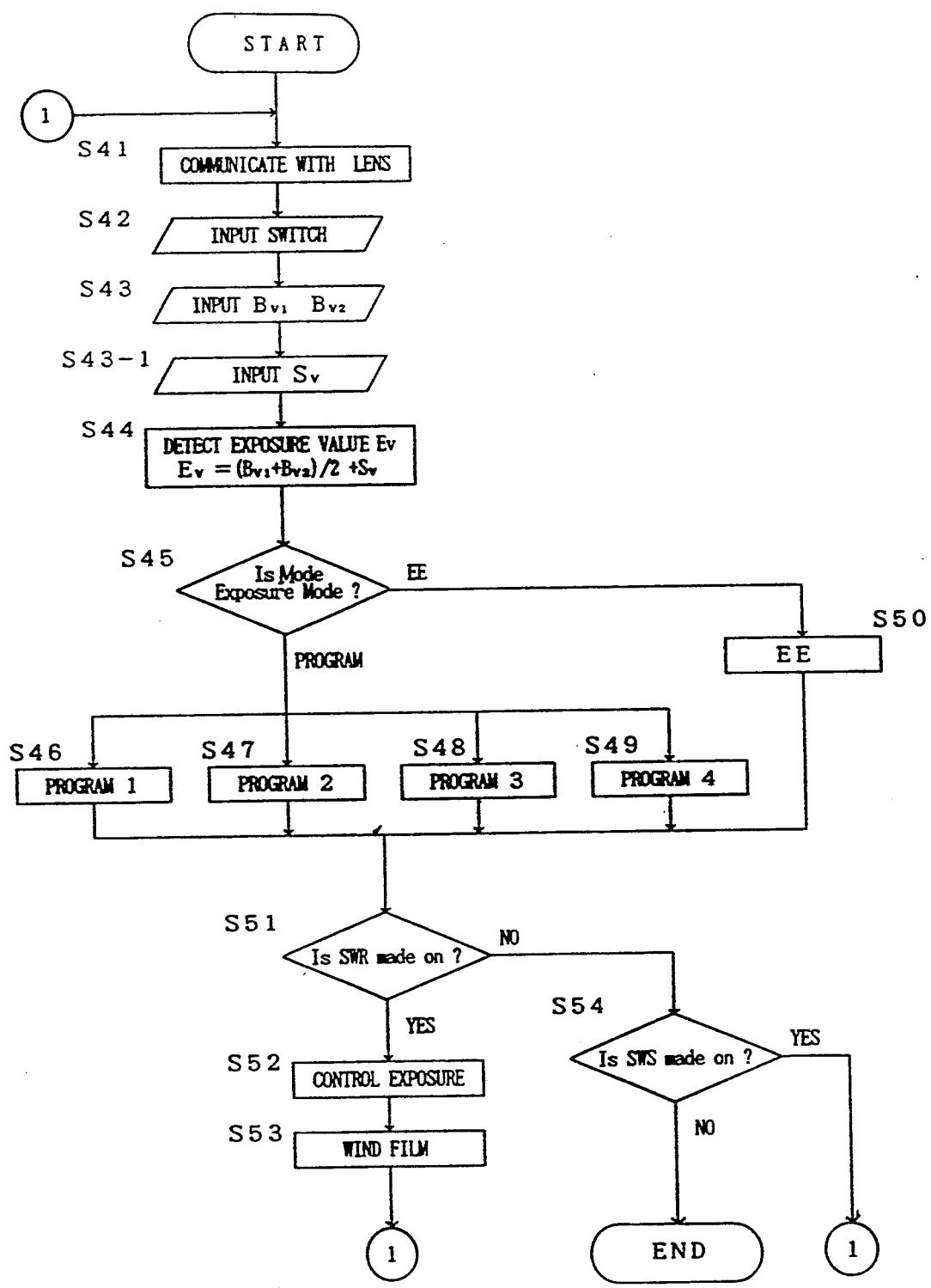
FIG. 10 is a main flow chart of a photographing operation of an exposure control apparatus according to the present invention.

The optimum diaphragm value data for each focal length zone is output from the lens CPU 41 in response to the demand of the camera body, for example upon the lens communication at step S41 shown in FIG. 10. The lens CPU 41 operates in response to the command data which is output from the camera body to check the level of the ports P3~P6 in order to detect the focal length, so that the optimum diaphragm F number which is required by the camera body is read out from the memory area in which the detected focal length is included to send the optimum diaphragm F number to the camera body.

Use of Diaphragm Assessment Data

In the above-mentioned embodiment, for each photographing lens, one optimum diaphragm F number is preset under each condition (assessment method) mentioned above. Alternatively, it is also possible to memorize the diaphragm assessment data which is assessed by an assessment method in a plurality of diaphragm values. As the diaphragm assessment data, the values designated by the ordinates of the graphs shown in FIGS. 1 through 3, or values which merely discriminate the order of the priority can be utilized.

In the illustrated embodiment, the MTF assessment is effected at the diaphragm values of the open diaphragm, the second diaphragm, the fourth diaphragm and the sixth diaphragm (minimum diaphragm), reckoned from the open diaphragm, respectively. The MTF assessment data (MTF 10, 11, 12, 13) at the respective diaphragm values are stored at the addresses 0~3 (FIG. 19).

Figure 20:
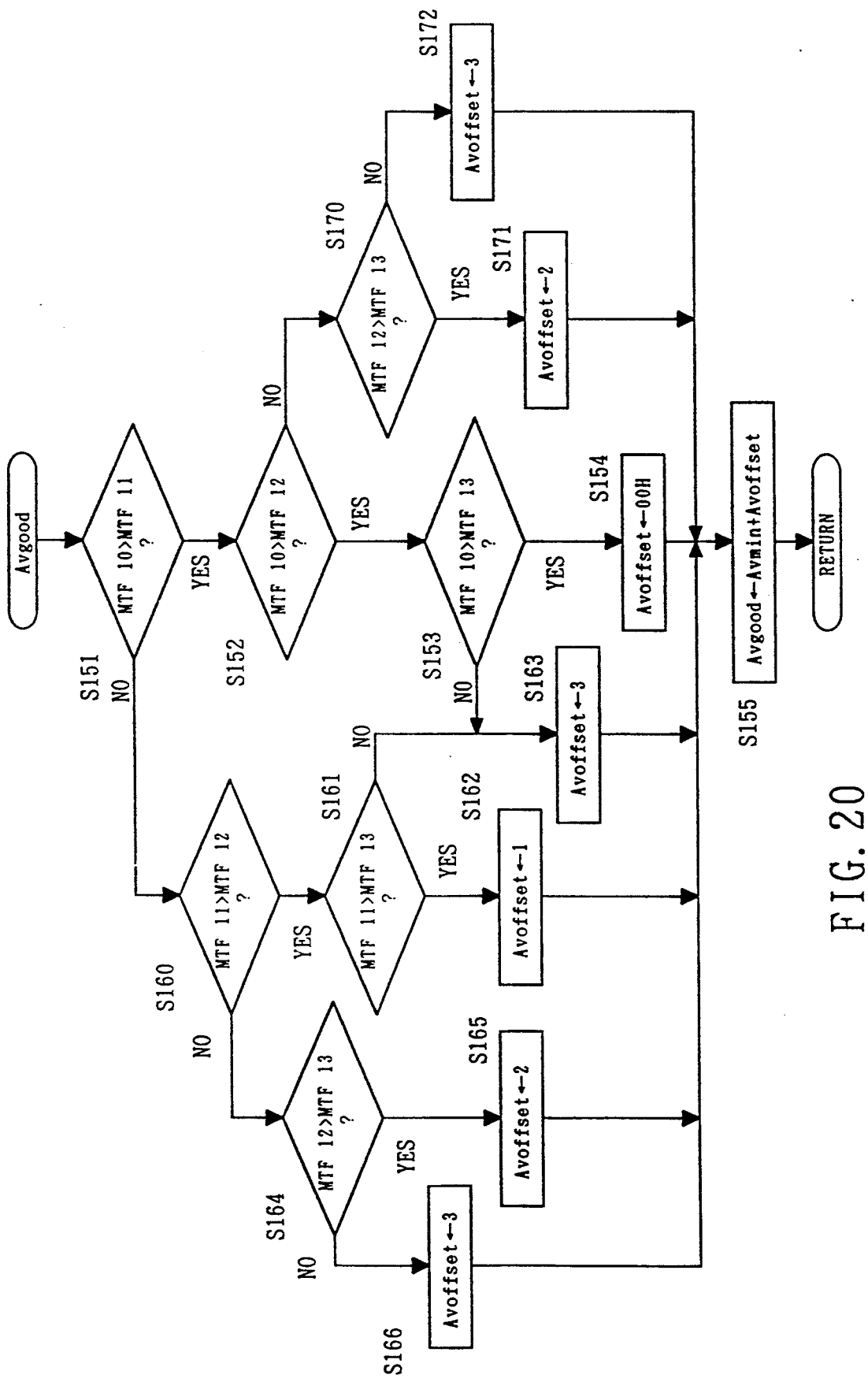

The operation for selecting the optimum diaphragm value Av from the MTF assessment data on the camera body side will be described below in detail with reference to a flow chart ($A_{vgood}$ flow chart) shown in FIG. 20.

Before the control enters the $A_{vgood}$ flow chart, all the data mentioned above are input to the main CPU 25 from the lens CPU 41. In the $A_{vgood}$ flow chart, the optimum data (largest data) is selected from the MTF 10, 11, 12 and 13, so that the offset diaphragm value $A_{voffset}$ corresponding to the selected data can be set. The offset diaphragm value $A_{voffset}$ is then added to the minimum diaphragm value Avmin to set the optimum diaphragm value $A_{vgood}$.

Namely, the MTF 10 is compared with the MTF 11 at step S151. If the MTF 10 is larger than the MTF 11, the MTF 10 is then compared with the MTF 12 at step S152. If the MTF 10 is larger than the MTF 12, the MTF 10 is then compared with the MTF 13 at step S153. If the MTF 10 is larger than the MTF 13, the offset diaphragm value $A_{voffset}$ is set to be "OOH" at step S154.

The value "OOH" is added to the minimum diaphragm value Avmin, which is then returned as the optimum diaphragm value $A_{vgood}$ at step S155.

If the MTF 11 is smaller than the MTF 10 at step S151, the MTF 11 is then compared with the MTF 12 at step S160. If the MTF 11 is larger than the MTF 12, the MTF 11 is compared with the MTF 13 at step S161. If the MTF 11 is larger than the MTF 13, the offset diaphragm value $A_{voffset}$ is set to be "1" at step S162. Thereafter, the control proceeds to step S155. If the MTF 13 is larger than the MTF 11, the offset diaphragm value $A_{voffset}$ is set to be "3" at step S163, and then, the control proceeds to step S155.

If the MTF 12 is larger than the MTF 11 at step S160, the MTF 12 is compared with the MTF 13 at step S164. If the MTF 12 is larger than the MTF 13, the offset diaphragm value $A_{voffset}$ is set to be "2" at step S165. Conversely, if the MTF 13 is larger than the MTF 12, the offset diaphragm value $A_{voffset}$ is set to be "3" at step S166, and then, the control proceeds to step S155.

If the MTF 12 is larger than the MTF 10 at step S152, the MTF 12 is compared with the MTF 13 at step S170. If the MTF 12 is larger than the MTF 13, the offset diaphragm value $A_{voffset}$ is set to be "2" at step S171. If the MTF 13 is larger than the MTF 12, the offset diaphragm value $A_{voffset}$ set is set to be "3" at step S172, and then. the control proceeds to step S155.

Thus, the optimum diaphragm value $A_{vgood}$ can be obtained by the above mentioned operations.

In the embodiment mentioned above, the data by the MTF assessment, the resolving power assessment, the circular diaphragm assessment and the vignetting assessment are independently used to set the optimum diaphragm data. Alternatively, it is also possible to use these assessment in combination. In such a combination (general assessment), the data can be weighed for each photographing lens or camera, in view of the characteristics and performance of the associated camera or lens.

As can be seen from the above discussion, in the automatic exposure control apparatus of the camera according to the present invention, since the optimum diaphragm data of the photographing lens at which a highest quality picture can be taken is stored in the memory provided in the photographing lens, the optimum diaphragm data can be read out, upon exposure, from the memory, so that the exposure parameter can be set with a priority of the optimum diaphragm data. Accordingly, anyone can easily take a clear picture at the optimum diaphragm value of the associated photographing lens.

We claim:

1. In a camera having memory means on a photographing lens for memorizing lens information of the photographing lens, and a lens information input means on a camera body to which said photographing lens is mounted, for inputting the lens information memorized in said memory means, said camera having an exposure control apparatus comprising:

said memory means has optimum diaphragm data which is determined in accordance with a predetermined specific condition stored in said memory means as the lens information; and said camera body comprises exposure operating means for arithmetically setting an exposure parameter based on the optimum diaphragm data which is input to said camera body through said lens information inputting means from said memory means.

2. An exposure control appparatus according to claim 1, wherein said diaphragm data is optimum diaphragm value data or optimum F number data which is determined in accordance with a specific condition of said photographing lens.

3. An exposure control apparatus according to claim 1, wherein said diaphragm data includes a plurality of optimum diaphragm values which are determined in accordance with and corresponding to specific conditions of said photographing lens.

4. An exposure control apparatus according to claim 3, wherein said camera body comprises a lens information selecting means for selecting a predetermined optimum diaphragm value from among the optimum diaphragm values stored in said memory means to input the selected optimum diaphragm value to said camera body through said lens information inputting means.

5. An exposure control apparatus according to claim 4, wherein said exposure operating means comprises an optimum diaphragm data priority mode in which the optium diaphragm value which is selected by said selecting means has a priority to determine the other exposure parameter.

6. An exposure control apparatus according to claim 2, wherein said specific conditions are that the MTF assessment becomes highest, the shape of the diaphragm aperture is substantially circular, a highest resolving power is obtained or a brightness ratio of the edge of image field is above a predetermined value.

7. An exposure control apparatus according to claim 3, wherein said specific conditions are that the MTF assessment becomes highest, the shape of the diaphragm aperture is substantially circular, a highest resolving power is obtained and a brightness ratio of the edge of image field is above a predetermined value.

8. A camera having a memory means on a photographing lens according to claim 1, wherein said optimum diaphragm data comprises a diaphragm value of said lens for at least one optimum condition of the produced image.

9. In a camera having memory means on a photographing lens for memorizing lens information of the photographing lens, and a lens information input means on a camera body to which said photographing lens is mounted, for inputting the lens information memorized in said memory means, and including an exposure control apparatus of a camera, comprising:

said memory means including optimum diaphragm assessment information which is determined in accordance with predetermined specific conditions in a plurality of diaghragms values of the photographing lens and which is stored as the lens information; and said camera body comprises a diaphragm assessment information selecting means for selecting specific diaphragm assessment information among the diaphragm assessment information input from the memory means through the lens information input means.

10. An exposure control apparatus according to claim 9, wherein said camera body further comprises and exposure operating means for arithmetically setting an exposure parameter based on the diaphragm assessment information selected by the diaphragm assessment information selecting means.

11. An exposure control apparatus according to claim 9, wherein said the diaphragm assessment information is that a MTF assessment becomes highest, a shape of the diaphragm aperture is substantially circular, a highest resolving power is obtained and/or a brightness ratio of the edge of image field is above a predetermined value.

12. In a camera having memory means on a photographing lens for memorizing lens information of the photographing lens, and a lens information input means on a camera body to which the photographing lens is mounted, for inputting the lens information memorized in said memory means, an exposure control apparatus of a camera comprising:

said photographing lens provided with an object distance detecting means for detecting the object distance of an object to be photographed, and said memory means has optimum diaphragm information which is stored in said memory means as the lens information and which corresponds to respective object distances or respective zones of an object distance which is divided into a plurality of zones.

13. An exposure control apparatus according to claim 12, wherein said photographing lens comprises an optimum diaphragm information selecting means for selecting optimum diaphragm information in accordance with the distance detected by said object distance detecting means.

14. An exposure control apparatus according to claim 13, wherein said object distance detecting means comprises a focus adjusting distance ring and a position detecting means for detecting a position of said distance ring.

15. An exposure control apparatus according to claim 14, wherein said photographing lens further comprises an optimum diaphragm information selecting means for selecting optimum diaphragm information in accordance with the distance detected by said position detecting means.

16. An exposure control apparatus according to claim 13, wherein said optimum diaphragm information is that the MTF assessment becomes highest, the shape of the diaphragm aperture is substantially circular, a highest resolving power is obtained or a brightness ratio of the edge of image field is above a predetermined value.

17. An exposure control apparatus according to claim 12, wherein said memory means has optimum diaphragm information which are stored in said memory means as the lens information and which corresponds to each of the detected objects distances or object distance zones of the detected object distance which is divided into a plurality of object distances zones in accordance with a plurality of predetermined conditions.

18. An exposure control apparatus according to claim 12, wherein said camera body further comprises an exposure operating means for setting an exposure parameter based on said optimum diaphragm information which is input from said memory means to said camera body through said lens information inputting means.

19. An exposure control apparatus according to claim 18, wherein said exposure operating means comprises an optimum diaphragm data priority mode in which said optimum diaphragm information which is stored in said memory means and which is read out, has a priority to determine other exposure parameters.

20. In camera having memory means on a zoom lens for memorizing lens information of said zoom lens, and a lens information input means on a camera body to which said zoom lens is mounted, for inputting lens information memorized in said memory means, an exposure control apparatus of a camera comprising:

said zoom lens comprises a focal length detecting means which detects a focal length of said zoom lens, and, said memory means comprising optimum diaphragm information stored in said memory means as said lens information and which correspond to respective focal lengths or respective focal length zones of a focal length which is divided into a plurality of focal length zones.

21. An exposure control apparatus according to claim 20, wherein said zoom lens further comprises an optimum diaphragm information selecting means for selecting optimum diaphragm information in accordance with the focal length detected by said focal length detecting means.

22. An exposure control apparatus according to claim 20, wherein said focal length detecting means comprises a movable zoom ring which varies the focal length when it moves and a detecting means for detecting a focal length corresponding to a position of said zoom ring.

23. An exposure control apparatus according to claim 20, wherein said optimum diaphragm information includes information that the MTF assessment becomes highest, the shape of the diaphragm aperture is substantially circular, a highest resolving power is obtained or a brightness ratio of the edge of image field is above a predetermined value.

24. An exposure control apparatus according to claim 20, wherein said camera body comprises a lens information selecting means for selecting predetermined optimum diaphragm data from among the optimum diaphragm information memorized in said memory means to input said selected optimum diaphragm data to said camera body through said lens information inputting means.

25. A photographing lens which is to be mounted to a camera body, comprising;

memory means for memorizing optimum diaphragm information in accordance with a specific condition of the photographing lens; and, data communication means for transferring said optimum diaphragm information to said camera body.

26. A photographing lens according to claim 25, wherein said diaphragm data is optimum diaphragm value data or optimum F number data which is determined in accordance with a specific condition of said photographing lens.

27. A photographing lens according to claim 26, wherein said specific condition is that the MTF assessment becomes highest, the shape of the diaphragm aperture is substantially circular, a highest resolving power is obtained or a brightness ratio of the edge of image field is above a predetermined value.

28. A photographing lens which is to be mounted to a camera body, comprising;

memory means for memorizing optimum diaphragm information corresponding to each of specific conditions of said photographing lens; and, data communication means for transferring the optimum diaphragm information to said camera body.

29. A photographing lens according to claim 28, wherein said specific conditions are that the MTF assessment becomes highest, the shape of the diaphragm aperture is substantially circular, a highest resolving power is obtained and a brightness ratio of the edge of image field is above a predetermined value.

30. A photographing lens which is to be mounted to a camera body, comprising:

memory means for memorizing optimum diaphragm information in accordance with specific conditions of said photographing lens in a plurality of diaphragm values of said lens; and, data communication means for transferring said optimum diaphragm information to said camera body.

31. A photographing lens which is to be mounted to a camera body, comprising;

memory means for memorizing lens information of said photographing lens, an object distance detecting means which detects the distance of an object to be taken, a data communication means for transferring the optimum diaphragm information to said camera body, and said memory means has optimum diaphragm information which is stored in said memory means as the lens information and which corresponds to respective object distances or respective zones of an object distance which is divided into a plurality of zones.

32. A photographing lens according to claim 31, having an optimum diaphragm information selecting means for selecting optimum diaphragm information in accordance with the detected distance of the object distance detecting means.

33. A photographing lens according to claim 31, wherein said object distance detecting means comprises a focus adjusting distance ring and a position detecting means for detecting the position of said distance ring.

34. A photographing lens according to claim 33, having an optimum diaphragm information selecting means for selecting optimum diaphragm information in accordance with the detected value of said position detecting means.

35. A photographing lens according to claim 31, wherein said optimum diaphragm information is that the MTF assessment becomes highest, the shape of the diaphragm aperture is substantially circular, a highest resolving power is obtained or a brightness ratio of the edge of image field is above a predetermined value.

36. A photographing lens according to claim 31, wherein said memory means has optimum diaphragm information which are stored in said memory means as said lens information and which correspond to each of the detected object distances or object distance zones of the detected object distance which is divided into a plurality of object distanc zones in accordance with a plurality of predetermined conditions.

37. A zoom lens which is to be mounted to a camera body, comprising;

memory means for memorizing lens information of the zoom lens, focal length detecting means which detects a focal length of said zoom lens, data communication means for transmitting optimum diaphragm information to the camera body; and, said memory means has optimum diaphragm information which is stored in said memory means as said lens information and which corresponds to respective focal lengths or respective focal length zones of a focal length which is divided into a plurality of focal length zones.

38. A zoom lens according to claim 37, having an optimum diaphragm information selecting means for selecting optimum diaphragm information in accordance with said focal length detected by said focal length detecting means.

39. A zoom lens according to claim 37, wherein said focal length detecting means comprises a movable zoom ring which varies the focal length of said lens when said ring moves and a position detecting means for detecting a focal length corresponding to a position of said zoom ring.

40. A zoom lens according to claim 37, wherein said optimum diaphragm information includes information that the MTF assessment becomes highest, the shape of the diaphragm aperture is substantially circular, a highest resolving power is obtained or the brightness ratio of the edge of image field is above a predetermined value.

* * * * *

UNITED STATES PATENT AND TRADEMARK OFFICE
CERTIFICATE OF CORRECTION

PATENT NO. : 5,126,780
DATED : June 30, 1992
INVENTOR(S) : O. SATOU et al.

It is certified that error appears in the above-indentified patent and that said Letters Patent is hereby corrected as shown below:

At column 16, line 11 (claim 5, line 4) change "optium" to ---optimum---.
　　　At column 16, line 51 (claim 10, line 2) change "and" to ---an---.
　　　At column 17, line 35 (claim 17, line 3) change "are" to be ---is---.
　　　At column 17, line 37 (claim 17, line 5) change "objects" to ---object---.
　　　At column 17, line 39 (claim 17, line 7) change "distances" to ---distance---.
　　　At column 20, line 3 (claim 36, line 7) change "distanc" to ---distance---.

Signed and Sealed this

Twentieth Day of September, 1994

Attest:

BRUCE LEHMAN

Attesting Officer　　　Commissioner of Patents and Trademarks